(12) United States Patent
Ingvarsson et al.

(10) Patent No.: US 6,508,115 B2
(45) Date of Patent: Jan. 21, 2003

(54) TRANSFER ROLL

(75) Inventors: Kjell Ingvarsson, Skultuna (SE); Dan Johansson, Västerås (SE); Ulf Olsson, Västerås (SE); Pär Gustafsson, Västerås (SE)

(73) Assignee: ABB-AB, Vasteras (SE)

( * ) Notice: Subject to any disclaimer, the term of this patent is extended or adjusted under 35 U.S.C. 154(b) by 0 days.

(21) Appl. No.: 09/880,785

(22) Filed: Jun. 15, 2001

(65) Prior Publication Data

US 2002/0005067 A1 Jan. 17, 2002

(30) Foreign Application Priority Data

Jul. 7, 2000 (SE) ............................................ 0002558-5

(51) Int. Cl.$^7$ ................................................. G01N 3/08
(52) U.S. Cl. ................... 73/159; 73/862.07; 73/862.55; 492/46; 492/45; 33/533
(58) Field of Search ............................ 73/159, 862.07, 73/862.55, 37; 492/46, 45; 33/533

(56) References Cited

U.S. PATENT DOCUMENTS

| | | | | |
|---|---|---|---|---|
| 3,481,194 A | * | 12/1969 | Sivilotti et al. ............... | 73/159 |
| 4,300,403 A | * | 11/1981 | Berger et al. ............. | 73/862.07 |
| 4,356,714 A | * | 11/1982 | Quehen ........................ | 72/11.7 |
| 4,366,720 A | * | 1/1983 | Berger et al. ............. | 73/862.07 |
| 4,428,244 A | * | 1/1984 | Takeda ..................... | 73/862.07 |
| 4,972,706 A | * | 11/1990 | Adolfsson et al. ............. | 73/159 |
| 5,557,100 A | * | 9/1996 | Jeuniaux et al. ........ | 250/227.16 |
| 5,693,893 A | * | 12/1997 | Anabuki et al. .......... | 73/862.07 |

* cited by examiner

*Primary Examiner*—Hezron Williams
*Assistant Examiner*—Andre' K. Jackson
(74) *Attorney, Agent, or Firm*—Dykema Gossett, PLLC

(57) ABSTRACT

A transfer roll 1 for conveying a strip of substantially flat material from one device to another. The strip passes over the transfer roll as the transfer roll rotates. The transfer roll includes a flat and smooth cylindrical outer skin which comprises at least two cylindrical elements. Between the cylindrical elements is arranged a mean 7 for reducing the mechanical stiffness of the cylindrical skin relative to the stiffness of the remainder of the cylindrical skin 2. Suitable means such as a welded joint 9 of reduced cross sectional thickness compared to the remainder of the cylinder are described. Such means separate the cylinder mechanically into a plurality of measurement areas with a predetermined degree of crosstalk. The transfer roll may be used to measure force or tension in strip material more accurately than with previous devices.

24 Claims, 2 Drawing Sheets

TRANSFER ROLL

TECHNICAL AREA

The invention is a device used in continuous and semi-continuous processes for the production of substantially flat material in a sheet, web or strip of materials such as paper or metals including copper, steel or aluminium. More particularly the invention is a transfer roll for use industrial processes such as in a paper machine or a rolling mill where a material is produced or processed as a strip.

BACKGROUND ART

In the production and processing of strip and sheet materials it is a basic requirement that a strip material is produced to a specification which typically includes at least a predetermined thickness and predetermined material properties. To achieve such predetermined requirements any mechanical forces applied to the strip during processing must be accurately controlled. A transfer roll that conveys strip material from one part of a process to another must convey the material while exerting a controlled tension or pressure that is accurately controlled and evenly distributed over the width of the roll.

A roll described in U.S. Pat. No. 3,481,194 issued in 1969 is designed as a measuring roll to measure flatness in a metal strip passing over the roll. Flatness is indirectly measured by the measuring roll with the help of a number of force sensors arranged inside the roll and against the inside of the outer cylindrical surface. The roll is notionally divided into a number of parallel zones across the width of the measuring roll and a force sensor measures a force applied by the roll to the strip in each zone. In this way the amount and distribution of force applied by the roll to the strip is known and process control techniques may be used to correct or optimise those forces to regulate properties of the strip such as, for example, tensile strength, flatness or other dimensional qualities. However, demands for increased accuracy over time means that it is difficult to measure certain forces in any one zone accurately. This is because of a tendency for a force applied in a zone of the roll to be shared with or transferred to an adjacent zone.

Transfer of force in an unintended or uncontrolled way is sometimes described as crosstalk. It is used in this description to describe uncontrolled transfer of mechanical forces between mechanically connected parts of a transfer roll.

U.S. Pat. No. 4,366,720 discloses a method of constructing a deflector roll, or a measuring roll. The roll is constructed using a series of disk-shaped sections of a cylinder, some of which are equipped with force measuring sensors. However, in general a difficulty arises with cylindrical rolls comprising such disk-shaped sections. In an industrial environment. there is a tendency for contaminants such as dirt, grease, particulate material or oxides to become trapped between neighbouring disk sections during normal use. This can give rise to a partial and unregulated transfer of force, crosstalk, between the disks, making it difficult to ensure accuracy of force distribution across the roll and of force measurement in areas distributed across the roll.

SUMMARY OF THE INVENTION

It is an object of the invention to provide a transfer roll in which an outer cylindrical skin of the transfer roll is separated into a series of cylindrical elements connected together by a mechanical connection of a known and predetermined stiffness.

It is another object of the invention to provide a transfer roll with which measurements of force taken in each cylindrical element of the roll are subject to a known and limited degree of crosstalk between elements, and a means for providing that result in the transfer roll.

Another object of the invention is to provide a method for welding together cylindrical elements to provide a transfer roll in which the cylindrical elements are mechanically connected to each other to a known and predetermined extent.

A yet another object of the invention is to provide a transfer roll in which the cylinder or cylindrical elements making up the cylinder are in a pre-stressed condition.

A further object of the invention is to provide a means for measuring a property of a strip material which measured value may be used in a monitoring, control or regulation function for the same strip material in the same or another process.

It is an object of the invention to provide a system to reduce flatness error in at least part of the length of a strip.

The invention may be summarily described as a transfer roll that carries a flat or strip material over from one device to another in a process. In particular the present invention is a transfer roll in which at least the inside surface of the cylindrical skin of the roll is wholly or partly separated into two or more cylindrical elements. By providing a means for reduced, predetermined and constant mechanical stiffness in a region of the cylinder between each cylindrical element, mechanical properties of the cylindrical skin in different parts of the overall cylinder are made dependent to a predictable degree within the operating limits of the transfer roll. First, this means that force applied by the transfer roll to a strip material may be applied evenly and with a greater accuracy than that previously available. Secondly, measurements carried out using the transfer roll are dependent to a known degree between one cylindrical element and the next. The degree of dependency due to crosstalk is known based on the predetermined mechanical stiffness and may be compensated for by calculation. This provides a consequent and decisive improvement in accuracy compared to existing transfer rolls. Consequently an error in a material property of the strip material passing over the transfer roll may be detected with greater accuracy than before. Optionally, error measurements measured with a greater accuracy than previously may subsequently used to reduce or correct such errors in the present process or another process for the same material.

The main advantage of the invention is that a strip of flat material may be processed or produced to a required property specification such as thickness or flatness with less error, and consequently less downgrading of product, scrap and waste. Such a significant reduction in errors and scrap will produce a large environmental benefit in terms of reduced use of materials and energy in the industrial processes where the transfer roll is used. The economic benefit of improved accuracy and reducing waste of materials and energy in continuous and other processes producing vast quantities of, for example, paper, board, foils, metals and plastic or synthetic materials is also great.

A method is described for providing a welded joint as a means for providing a region of predetermined and reduced stiffness between any two cylindrical elements of the transfer roll. An advantage of the method disclosed according to a best use of the present invention is that the design of the joint also acts to prevent molten material from the welded joint from entering the interior of the transfer roll. Another advantage of this method is that any small variation in depth of weld is accommodated by an advantageous allowance in thickness of an un-fused part of the element cross section. A further advantage of the welded joint is that the cylindrical elements may conveniently and separately be pre-stressed before they are joined together. Pre-stressing the cylindrical skin provides for increased accuracy of measurement of force applied by the roller to a strip.

It is also an advantage that the welded joint once made may also be made perfectly smooth on the outside surface of the transfer roll using conventional manufacturing techniques for producing metal covered rolls. Thus the outer surface is made perfectly flat and level to the specifications normally required so as not to mark or mar the surface of a web of material or a rolled strip. Such a welded joint may also be produced to so that it is seamless and complete, preventing the build up or penetration of contaminants of any sort.

A still further advantage of the invention is that the accuracy of measurement across the roll is greatly improved relative to the prior art, and so the transfer roll may be used in new applications and branches of industry where the previous limitations of accuracy made such transfer rolls and measuring rolls problematic.

Another advantage is that the transfer roll may be easily and economically retrofitted to existing processes to improve accuracy and thus reduce costs.

BRIEF DESCRIPTION OF THE DRAWINGS

The present invention will be described in more detail in connection with the enclosed drawings.

DESCRIPTION OF THE PREFERRED EMBODIMENTS

Figure 1:
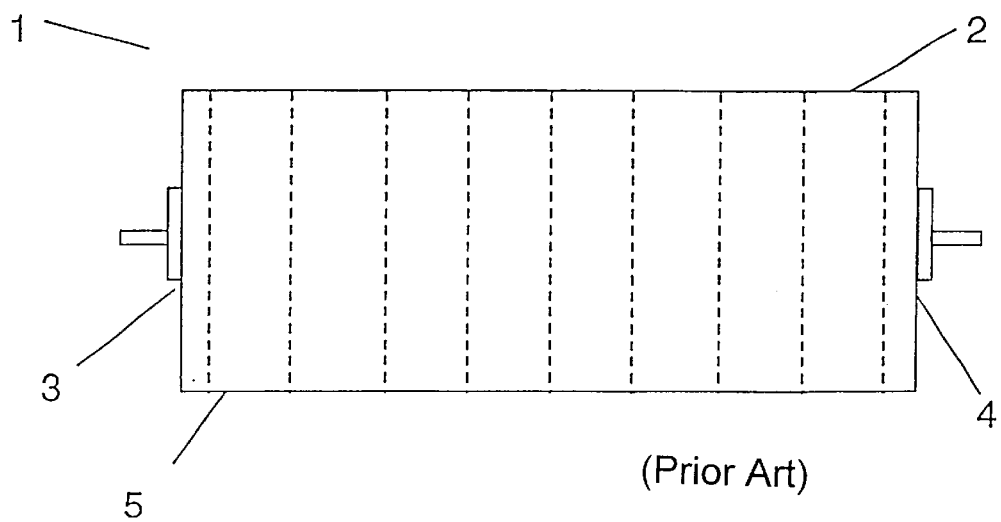
FIG. 1 (Prior art) shows schematically an axial section of a transfer roll arranged as a flatness measuring roll according to the known art.
Figure 2:
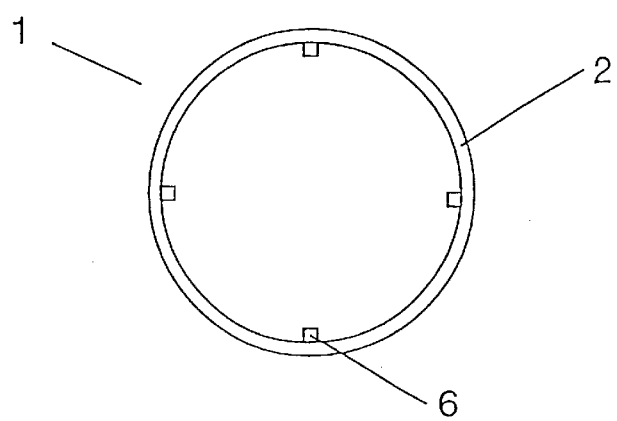
FIG. 2 (Prior art) shows schematically a cross section of the same transfer roll according to the known art.

A roll equipped with measuring means arranged to measure flatness of a strip of rolled metal according to a method and device from the Prior Art is shown in FIG. 1 and FIG. 2.

FIG. 1 shows a cross section of a transfer roll 1 along the long axis of the cylinder with a cylindrical outer shell 2 arranged between two ends 3, 4. The cylinder surface is notionally divided up into a series of zones 5 for measurement. FIG. 2 shows an axial cross section of the same roll arranged with sensors inside the cylinder including sensor 6.

One or more sensors are arranged inside the cylinder in contact with the cylindrical skin of the roll at one or more points around the periphery in one or more zones. As the roll rotates, a force exerted by the cylindrical skin against a strip of material passing over the roll is measured in each zone by each of the one or more sensors.

Figure 3:
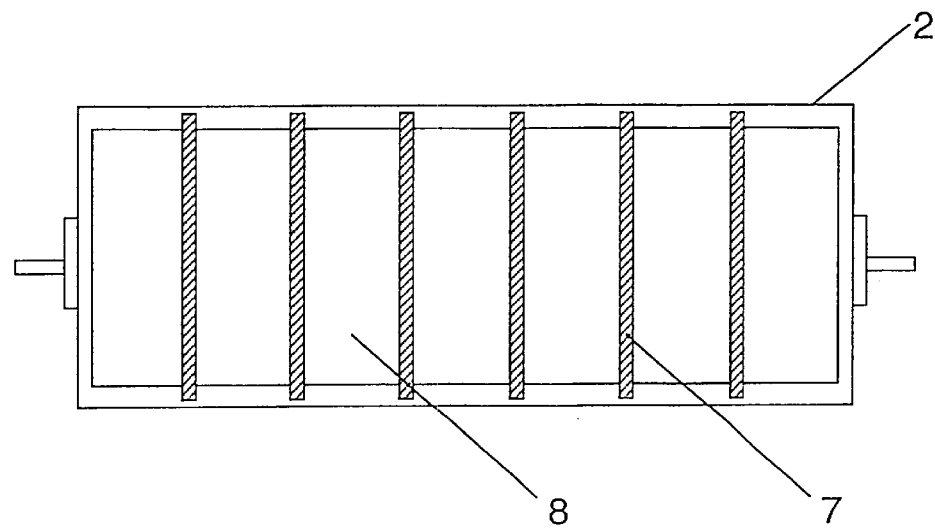
FIG. 3 shows a simplified cross section diagram of a transfer roll according to an embodiment of the present invention.

FIG. 3 shows a transfer roll according to an embodiment of the present invention. A cylindrical skin 2 is shown. The cylindrical skin contains cylindrical elements such as 8 and recesses 7 in the inside surface of the cylindrical skin. The cylindrical skin 2 is thus thinner between the cylindrical elements where the recesses 7 are arranged.

Figure 4:
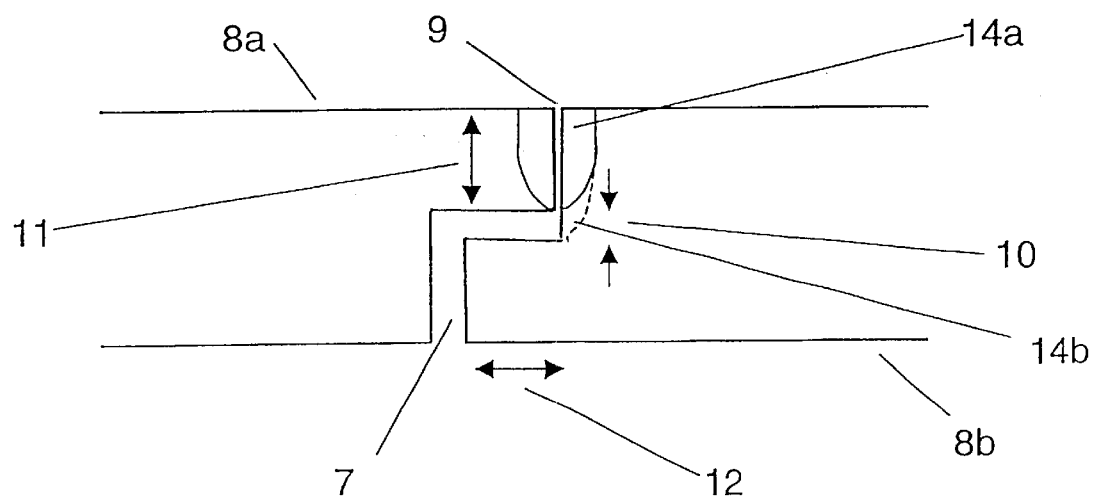
FIG. 4 shows a schematic diagram of a cross section of a joint between two cylindrical elements of a transfer roll according to an embodiment of the present invention.

FIG. 4 shows a preferred method to provide an embodiment of the present invention. A schematic section through a joint 9 between two cylindrical elements 8a, 8b is illustrated. Cylindrical elements 8a, 8b are joined by a predetermined thickness of material 11. The predetermined thickness 11 may be likened to a step of material which is matched up with a co-operating and underlying step at the end of the other cylindrical element 8b. The underlying step of 8b is defined by a depth equal to dimensions 14a plus 14b and a length in the axial direction equal to dimension 12. A welded joint 9 is shown taking up a depth equivalent to the predetermined thickness 11. A heat effected zone for that weld depth is illustrated and indicated as 14a. A dotted line 14b shows where the depth of weld may vary only up to a predetermined additional depth 10. The recess 7 is shown in the cross section.

A plurality of recesses 7 divide up the cylindrical skin of the transfer roll into a number of cylindrical elements 8. Each element is joined at the cylindrical periphery by a predetermined thickness of material 11 which is selected so as to give a predetermined mechanical rigidity. The use of a means to reduce stiffness between the cylindrical elements makes the cylindrical elements mechanically dependent on each other to a known, constant and predetermined extent, thus limiting crosstalk between the sections, within the operating limits of the transfer roll.

By this means, a force applied at a point on the surface of one cylindrical element of the transfer roll has a limited but predictable and calculable force on any other cylindrical element. Thus the force measured at the point of the surface may be compensated accurately for a known and limited degree of crosstalk from a force acting on another cylindrical element.

In the preferred method of welding cylinder elements together the joint is further designed in cross section as a Z-shape. The Z-shape of the weld allows for a variation in the depth of the weld, from 11 to a depth of 10 without affecting the effective predetermined thickness of the joint 11, and thus without affecting the predetermined stiffness. The Z-shape of the weld also prevents any molten material from flowing into the inside of the cylinder. An additional advantageous aspect of this method is that one or more cylinder elements may be treated before joining them together to improve the physical properties of the element. For example, one or more ring elements may advantageously be pre-stressed before joining in order to improve the mechanical behaviour of the element for operating or measuring purposes. This is beneficial in arranging the cylindrical skin to apply a desired pre-stressing force to force sensors mounted inside the roll.

In the preferred embodiment of the transfer roll, one or more sensors are placed inside the cylindrical skin in a similar way to the prior art. Sensors may be placed in one or more cylindrical elements. Magnetoelastic sensors of the Pressductor type are used to give an accurate and reliable measurement of a mechanical force applied to the skin of the transfer roll.

The operation of a magnetoelastic sensor of the Pressductor type is based on the fact that the magnetic permeability of a magnetic material changes under mechanical stress. This type of sensor has a primary and a secondary winding each wound through the same two holes in a sensor material comprising a stack of magnetostrictive metal lamella. The primary winding is provided with alternating current for magnetization of the material. The secondary winding measures voltages that arise due to mechanical load imposed on the magnetostrictive material of the sensor. Another type of magnetoelastic sensor may be used to provide greater accuracy, such as in the manufacturing of metal foils, which sensor comprises regions of sensor material with a primary and a secondary winding separately wound through four holes in the sensor material such that the two wirings cross at right angles.

A plurality of measurements from sensors in the transfer roll provides a measurement of distribution of the measured force over the skin of the cylinder, and thus on or in the strip material running over the transfer roll. Such measurements are used to calculate tension in the material being transferred, tension on the transfer roll. These measurements in turn may be used to calculate dimensional properties such as flatness or thickness or other properties of a strip material.

In the best use of the preferred embodiment a control unit is used to collect the measurements made by the sensors. Such a control unit is typically equipped with storage means and calculating means. It is preferably arranged connected to one or more databases for the storage of measured values and calculated values of one or more properties of the flat- or rolled strip material. Thus the transfer roll comprises an active component of a measurement system for supervising and/or regulating a property of the strip material.

In another embodiment of the invention, a different method is used to provide a roll with a cylindrical skin that is internally divided into cylindrical elements. The method is to make a cylindrical cut on the inside of the cylindrical skin to a predetermined depth using a suitable cutting device or tool. In this way a recess of the correct depth may be provided leaving the cylindrical elements connected together by a region of material of the cylindrical skin that has been reduced to a predetermined thickness. The recess may have any cross section, for example or hemispherical. The material be removed from the cylindrical skin by cutting, melting, spark erosion or other suitable means to form a substantially complete cylindrical recess between two cylindrical elements.

In a further embodiment of the invention the means for reduced stiffness is a localized region in which material properties are different from the surrounding material. This is accomplished by changing the material microstructure so that the rigidity is reduced in a localized region. This may be accomplished for example by localized heat treatment.

The preferred sensor for use in the invention is, as stated above, a magnetoelastic sensor that depends on a magneostrictive property of a magnetic material to produce a signal in a measurement coil in proportion to a mechanical load applied to that material. However, it is also possible to carry out the invention using one or more sensors based on other measurement techniques such as, for example, strain gauges, piezo electric materials.

What is claimed is:

1. A transfer roll for conveying a strip of substantially flat material, comprising: an outer cylindrical skin; one or more sensors for measuring force in operative relationship therewith, the outer cylindrical skin comprising at least two cylindrical elements, a continuous mechanical joint for interconnecting the cylindrical elements providing a region of predetermined and reduced mechanical stiffness relative to the stiffness of the remainder of the cylindrical skin.

2. A transfer roll according to claim 1, wherein said means is a region of the cylindrical skin including a reduction in cross section thickness.

3. A transfer roll according to claim 2, wherein said means comprises a joint and the cylindrical elements are joined together such that the cross section of the resulting cylinder is reduced in thickness at the joint relative to the cross section of the remainder of the cylindrical skin.

4. A transfer roll according to claim 3, wherein said joint is a welded joint.

5. A transfer roll according to claim 1, wherein one or more cylindrical elements of the transfer roll is in a prestressed condition.

6. A transfer roll according to claim 1, wherein said means for reducing the mechanical stiffness of the cylindrical skin comprises at least one recess made in the interior surface of the cylindrical skin of the transfer roll.

7. A transfer roll according to claim 1, wherein the means for reducing the mechanical stiffness of the cylindrical skin comprises at least one cylindrical region in the material of the cylindrical skin of the transfer roll in which the microstructure of the material has been altered.

8. A transfer roll according to claim 1, wherein one or more sensors capable of measuring a mechanical force are arranged adjacent the inside surface of the cylindrical skin in one or more of each cylindrical element comprising said transfer roll.

9. A transfer roll according to claim 8, wherein the one or more force sensors is a magnetoelastic sensor.

10. A transfer roll according to claim 8, wherein the one or more force sensors comprise a strain gauge.

11. A transfer roll according to claim 8, wherein the one or more force sensors comprise a piezoelectric sensor.

12. A transfer roll according to claim 1, wherein the outer cylindrical surface of the transfer roll is flat and level.

13. The use of a transfer roll according to claim 1 for measuring a property of a strip of flat or rolled material.

14. The use of a transfer roll according to claim 1 for measuring a force exerted by said transfer roll against a strip.

15. The use of a transfer roll according to claim 1 for measuring the flatness of a strip.

16. A method to provide transfer roll wherein at least two or more cylindrical elements are joined together, comprising the step of welding together said two or more cylindrical elements producing a welded joint between the substantially circular ends of said two or more cylindrical elements.

17. A method according to claim 16, comprising prestressing a cylindrical element before joining it to one or more other cylindrical elements.

18. A method according to claim 17, comprising making smooth the outer surface of the cylinder such that the cylindrical skin including the joints between cylindrical elements is flat and level on the outside of the transfer roll.

19. A method, according to claim 16, removing material from the interior surface of the cylindrical skin between two cylindrical elements so forming one or more recesses in the cylindrical skin of the transfer roll.

20. A system for measuring a characteristic of a strip of flat or rolled material, wherein a transfer roll is arranged with sensors for measurement of a force placed inside said transfer roil having a cylindrical skin, and a control unit for processing measurement values from said sensors,, including a plurality of cylindrical elements and a means for providing a region of cylindrical skin of predetermined and reduced mechanical stiffness together such that the stiffness of the joint is known and less than the stiffness of the surrounding material of the cylindrical element.

21. The use of a system according to claim 20 for measuring a property of a strip of flat or rolled material.

22. A transfer roll for conveying a strip of substantially flat material, comprising: an outer cylindrical skin; one or more sensors for measuring force in operative relationship therewith, the outer cylindrical skin comprising at least two cylindrical elements; a welded joint for mechanically connecting the cylindrical elements for providing a region of predetermined and reduced mechanical stiffness relative to the stiffness of the remainder of the cylindrical skin and wherein the joint has a cross section reduced in thickness relative to the thickness of the remainder of the cylindrical skin, and wherein the welded joint is formed between a step of reduced thickness in the cylindrical skin material of a substantially circular end of one cylindrical element and an underlying co-operating step in a circular end of the other cylindrical element.

23. A method to provide a transfer roll wherein at least two or more cylindrical elements are joined together, comprising the step of:

welding together said two or more cylindrical elements producing a welded joint between the substantially circular ends of said two or more cylindrical elements, and joining said two or more cylindrical elements by a partial thickness only of the cross section of the cylindrical skin adjacent to the joint.

24. A transfer roll for conveying a strip of substantially flat material, comprising: an outer cylindrical skin; including at least two cylindrical elements each having a selected thickness and a stepped end portion of reduced thickness engaging each other for forming an overlapping end region for providing a continuous region of predetermined and reduced mechanical stiffness in said overlapping region.

* * * * *